United States Patent [19]
Singer et al.

[11] Patent Number: 5,817,584
[45] Date of Patent: Oct. 6, 1998

[54] HIGH EFFICIENCY BREATHING MASK FABRICS

[75] Inventors: Irwin Jerold Singer, Lawrenceville; Richard Daniel Pike, Norcross, both of Ga.

[73] Assignee: Kimberly-Clark Worldwide, Inc., Neenah, Wis.

[21] Appl. No.: 577,370

[22] Filed: Dec. 22, 1995

[51] Int. Cl.[6] .................................................. A62B 18/02
[52] U.S. Cl. ................... 442/345; 128/206.21; 428/903; 442/351; 442/361; 442/362; 442/364; 442/373; 442/382; 442/414
[58] Field of Search .................................... 442/340, 345, 442/334, 351, 361, 362, 373, 382, 414, 364; 428/903, 373; 128/206.21

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,423,266 | 1/1969 | Davies et al. | 156/167 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 4,041,203 | 8/1977 | Brock et al. | 428/157 |
| 4,215,682 | 8/1980 | Kubik et al. | 128/205 |
| 4,340,563 | 7/1982 | Appel et al. | 264/518 |
| 4,363,682 | 12/1982 | Thiebault | 156/181 |
| 4,374,888 | 2/1983 | Bornslaeger | 428/198 |
| 4,375,718 | 3/1983 | Wadsworth et al. | 29/592 |
| 4,419,993 | 12/1983 | Petersen | 128/201.15 |
| 4,547,420 | 10/1985 | Krueger et al. | 428/229 |
| 4,592,815 | 6/1986 | Nakao | 204/165 |
| 4,662,005 | 5/1987 | Grier-Idris | 2/9 |
| 4,802,473 | 2/1989 | Hubbard et al. | 128/206.19 |
| 4,874,659 | 10/1989 | Ando et al. | 428/221 |
| 4,883,052 | 11/1989 | Weiss et al. | 128/205.27 |
| 5,035,240 | 7/1991 | Braun et al. | 128/205.27 |
| 5,108,820 | 4/1992 | Kaneko et al. | 428/198 |
| 5,169,706 | 12/1992 | Collier, IV et al. | 428/152 |
| 5,206,061 | 4/1993 | Ando et al. | 428/34.7 |
| 5,307,796 | 5/1994 | Kronzer et al. | 128/206.16 |
| 5,336,552 | 8/1994 | Strack et al. | 428/224 |
| 5,382,400 | 1/1995 | Pike et al. | 264/168 |
| 5,401,446 | 3/1995 | Tsai et al. | 264/22 |
| 5,540,979 | 7/1996 | Yahiaoui et al. | 428/212 |

FOREIGN PATENT DOCUMENTS

| | | | |
|---|---|---|---|
| 0 121 299 | 10/1984 | European Pat. Off. | |
| 0 391 726 | 10/1990 | European Pat. Off. | B01D 39/14 |
| 0 634 511 | 1/1995 | European Pat. Off. | D04H 1/54 |
| 95/13856 | 5/1995 | WIPO | B01D 39/08 |

*Primary Examiner*—James J. Bell
*Attorney, Agent, or Firm*—William D. Herrick; James B. Robinson

[57] ABSTRACT

A breathing mask fabric is provided which has between 50 and 95 weight percent of a through-air bonded, electret treated, nonwoven microfiber first web of fibers where the fibers have an average diameter of between about 10 and 25 microns and where the first web has a Frazier Permeability above about 100 CFM/SF, a density of between about 0.015 and 0.15 gms/cc, and a basis weight between about 67 gsm and about 340 gsm, and between about 5 and 50 weight percent of an electret treated microfiber second web of fibers where the fibers have an average diameter of less than about 10 microns.

27 Claims, 3 Drawing Sheets

HIGH EFFICIENCY BREATHING MASK FABRICS

BACKGROUND OF THE INVENTION

This invention relates generally to a nonwoven fabric or web which is formed from microfibers of a thermoplastic resin, and laminates using such a web as a component which have been made into a filter for use in breathing masks such as, for example, a face mask or a respirator.

Thermoplastic resins have been extruded to form fibers, fabrics and webs for a number of years. The most common thermoplastics for this application are polyolefins, particularly polypropylene. Other materials such as polyesters, polyetheresters, polyamides and polyurethanes are also used to form nonwoven microfiber fabrics.

Nonwoven fabrics or webs are useful for a wide variety of applications such as diapers, feminine hygiene products, towels, recreational or protective fabrics and as geotextiles and filter media. The nonwoven webs used in these applications may be simply spunbond fabrics but are often in the form of nonwoven fabric laminates like spunbond/spunbond (SS) laminates or spunbond/meltblown/spunbond (SMS) laminates. Laminates with other materials are also possible such as with films and tissue.

As filter media, some of the desired characteristics of nonwoven fabrics are that they be permeable to the fluid being filtered yet have a high filtration efficiency. Permeability to the fluid being filtered is quite important as low permeability could result in a high pressure drop across the filter. In an application such as a breathing mask, a high pressure drop would mean the wearer would have a difficult time drawing enough air to breath comfortably. One example of a previous attempt at a breathable mask is taught in U.S. Pat. No. 4,547,420 to Krueger et al. which describes bicomponent meltblown webs which may be electrically charged. Meltblown webs unfortunately tend to have small pore sizes due to high densities and smaller fibers and therefore pressure drops which are undesirably high.

Filtration efficiency for fabrics is commonly expressed in terms of NaCl penetration using particles of about 0.1 micron. A NaCl efficiency above 80 percent is usually required for breathing mask applications and even above 95, 99 or 99.97 percent for certain medical applications.

In many applications, filtration materials are required which have structural integrity by themselves and can be converted into various shapes and which will then hold that shape. Breathing masks are often made into a pleated shape which gives far more surface area for filtration than a non-pleated shape in the same space.

While there have been previous attempts to produce microfiber breathing masks, there remains a need for such a breathing mask having a low pressure drop (i.e. high permeability) and high NaCl efficiency.

It is an object of this invention to provide a microfiber polymer nonwoven fabric or web for use as a filter medium which has a high permeability and high filtration efficiency. It is a further object of this invention to provide a breathing mask which may be a face mask for medical or other use and a respirator for industrial/commercial use.

SUMMARY OF THE INVENTION

The objects of this invention are achieved by a breathing mask fabric which has between 50 and 95 weight percent of a through-air bonded, electret treated, nonwoven microfiber first web of fibers where the fibers have an average diameter of between about 10 and 25 microns and where the first web has a Frazier Permeability above about 100 CFM/SF, a density of between about 0.015 and 0.15 gms/cc, and a basis weight between about 100 gsm and about 340 gsm, and between about 5 and 50 weight percent of an electret treated microfiber second web of fibers where the fibers have an average diameter of less than about 10 microns.

DEFINITIONS

Figure 1:
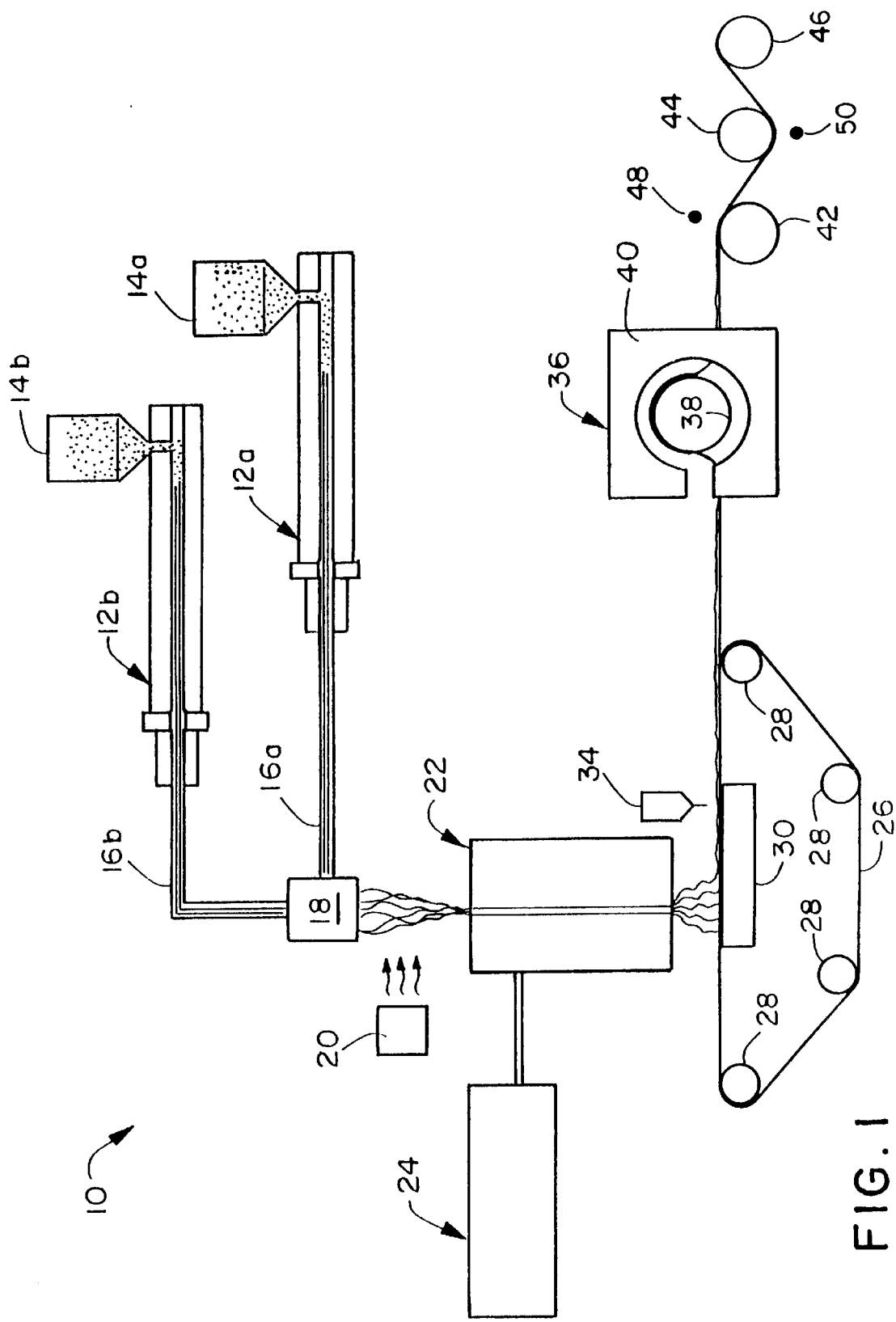
FIG. 1 is a schematic drawing of a process line for making a filter medium of this invention.

As used herein the term "nonwoven fabric or web" means a web having a structure of individual fibers or threads which are interlaid, but not in an identifiable manner as in a knitted fabric. Nonwoven fabrics or webs have been formed from many processes such as, for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 (15²×0.89×0.00707=1.415). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (using a sample size of at least 10) larger than 7 microns, more particularly, between about 10 and 25 microns.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin. Meltblown fibers are microfibers which may be continuous or discontinuous, are generally smaller than 10 microns in average diameter (using a sample size of at least 10), and are generally tacky when deposited onto a collecting surface.

As used herein the term "monocomponent" fiber refers to a fiber formed from one or more extruders using the same polymer. This is not meant to exclude fibers formed from one polymer to which small amounts of additives have been added for color, anti-static properties, lubrication, hydrophilicity, etc. These additives, e.g. titanium dioxide for color, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may use the same polymer from each extruder. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a segmented configuration wherein the polymers are arranged like slices of a pie, or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein, through air bonding or "TAB" means a process of bonding a nonwoven conjugate fiber web in which air which is sufficiently hot to melt one of the polymers of which the fibers of the web are made is forced through the web. The air velocity is between 100 and 500 fpm (30–152 m/min.) and the dwell time may be as long as 60 seconds. The air temperature may be between about 230 and 325° F. (110°–162° C.), depending on the melting points of the polymers used. The melting and resolidification of the polymer provides the bonding. TAB requires the melting of at least one component to accomplish bonding so it is restricted to webs with at least two components like conjugate fibers or those which include an adhesive.

As used herein, "ultrasonic bonding" means a process performed, for example, by passing the web between a sonic horn and anvil roll as illustrated in U.S. Pat. No. 4,374,888 to Bornslaeger.

TEST METHODS

Frazier Permeability: A measure of the permeability of a fabric or web to air is the Frazier Permeability which is performed according to Federal Test Standard No. 191A, Method 5450 dated Jul. 20,1978, and is reported as an average of 3 sample readings. Frazier Permeability measures the air flow rate through a web in cubic feet of air per minute per square foot of web or CFM/SF. Convert CFM/SF to liters per square meter per minute (LSM) by multiplying CFM/SF by 304.8.

NaCl Efficiency: The NaCl Efficiency is a measure of the ability of a fabric or web to stop the passage of small particles through it. A higher efficiency is generally more desirable and indicates a greater ability to remove particles. NaCl efficiency is measured in percent according to the TSI Inc., Model 8110 Automated Filter Tester Operation Manual of February 1993, P/N 1980053, revision D, at a flow rate of 32 liters per minute using 0.1 micron sized NaCl particles and is reported as an average of 3 sample readings. This method can also yield the pressure drop of a sample using 0.1 micron particles. The manual is available from TSI Inc. at PO Box 64394, 500 Cardigan Rd, St. Paul, Minn. 55164.

Melt Flow Rate: The melt flow rate (MFR) is a measure of the viscosity of a polymer. The MFR is expressed as the weight of material which flows from a capillary of known dimensions under a specified load or shear rate for a measured period of time and is measured in grams/10 minutes at a set temperature and load according to, for example, ASTM test 1238-90b.

DETAILED DESCRIPTION

The microfibers of the through-air bonded web used in the practice of this invention may be made by the spunbond process. The spunbond process generally uses a hopper which supplies polymer to a heated extruder. The extruder supplies melted polymer to a spinneret where the polymer is fiberized as it passes through fine openings arranged in one or more rows in the spinneret, forming a curtain of filaments. The filaments are usually quenched with air at a low pressure, drawn, usually pneumatically and deposited on a moving foraminous mat, belt or "forming wire" to form the nonwoven web. Polymers useful in the spunbond process generally have a process melt temperature of between about 400° F. to about 610° F. (200° C. to 320° C.).

The fibers produced in the spunbond process are usually in the range of from about 10 to about 40 microns in average diameter, depending on process conditions and the desired end use for the webs to be produced from such fibers. For example, increasing the polymer molecular weight or decreasing the processing temperature results in larger diameter fibers. Changes in the quench fluid temperature and pneumatic draw pressure can also affect fiber diameter.

The fabric of this invention is a multilayer laminate. An example of a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al. or as a spunbond/spunbond laminate. An SMS laminate may be made by sequentially depositing onto a moving conveyor belt or forming wire first a spunbond web layer, then a meltblown web layer and last another spunbond layer and then bonding the laminate in a manner described above. Alternatively, the three web layers may be made individually, collected in rolls, and combined in a separate bonding step. Such fabrics usually have a basis weight of from about 0.1 to 12 osy (6 to 400 gsm), or more particularly from about 0.75 to about 3 osy.

It is preferred that the fibers of the through-air bonded web used in the practice of this invention have a high bulk or loft since a low loft fabric will generally have a higher pressure drop. Loftiness may be expressed as a function of web density and web density for the fabric used herein is preferably between about 0.015 and 0.15 grams/cc, more particularly between about 0.015 and 0.08 gms/cc or still more particularly between about 0.015 and 0.04 gms/cc.

One type of spunbond fibers which may be used to produce the through-air bonded web of this invention are conjugate fibers, such as side-by-side (S/S) fibers. The polymers used to produce the fibers may be any of those known in the art to be fiberizable. Fiberizable polymers include polyurethane, polyvinylchloride, polytetrafluoroethylene, polystyrene, polyethylene terephathalate, polyamides, polycarbonates, and polyolefins like, for example, 4-methyl-1-pentene, polybutylene, polypropylene and polyethylene. As these conjugate fibers are produced and cooled, the differing coefficients of expansion of the polymers, the differing densities of the polymers as they go through the phase change to a solid, and other factors cause these fibers to bend and ultimately to crimp, somewhat akin to the action of the bimetallic strip in a conventional room thermostat. The crimp may be enhanced by the use of the hot air used to draw the fibers to activate the fiber latent crimp, which is discussed in detail in U.S. Pat. No. 5,382,400 to Pike et al. which has been incorporated by reference in its entirety. Crimped fibers have an advantage over uncrimped fibers in that they produce a more bulky web which therefore increases fabric or web permeability.

As spunbond fiber webs are produced they are generally treated with a compaction roll or hot air knife to give the web sufficient integrity for further processing. This is not strictly required since it is possible, with great care, to take the web directly to a more substantial bonding process without either of these treatments. After formation and the optional compaction roll or hot air knife treatment the web is subjected to through-air bonding. Through-air bonding provides the capability of producing a loftier web since it does not compact the web and reduce the bulk density as do other methods such as thermal point bonding. Through-air bonding has the added benefit as compared to thermal point bonding, of not producing bond points which restrict the air flow, an important point for a breathing mask.

After through-air bonding the web may be electret treated. Electret treatment further increases filtration efficiency by drawing particles to be filtered toward the fibers of the filter by virtue of their electrical charge. Electret treatment can be carried out by a number of different techniques. One technique is described in U.S. Pat. No. 5,401,446 to Tsai et al. assigned to the University of Tennessee Research Corporation and incorporated herein by reference in its entirety. Tsai describes a process whereby a web or film is sequentially subjected to a series of electric fields such that adjacent electric fields have substantially opposite polarities with respect to each other. Thus, one side of the web or film is initially subjected to a positive charge while the other side of the web or film is initially subjected to a negative charge. Then, the first side of the web or film is subjected to a negative charge and the other side of the web or film is subjected to a positive charge. Such webs are produced with a relatively high charge density. The process may be carried out by passing the web through a plurality of dispersed non-arcing electric fields like, for example, between a charging wire or bar and a charged roller at a certain gap, where the field and gap may be varied over a range depending on the charge desired in the web. The web may be charged at a range of about −30 kVDC/cm to 30 kVDC/cm or more particularly −10 kVDC/cm to 25 kVDC/cm and still more particularly −5 kVDC/cm to about 25 kVDC/cm. The gap may be about 0.25 inch (6.5 mm) to about 2 inches (51 mm) or more particularly about 0.5 to 1.5 inches (13 to 38 mm) or still more particularly about an inch (25.4 mm).

Other methods of electret treatment are known in the art such as that described in U.S. Pat. Nos. 4,215,682 to Kubik et al, 4,375,718 to Wadsworth, 4,592,815 to Nakao and 4,874,659 to Ando.

Many polyolefins are available for fiber production, for example polyethylenes such as Dow Chemical's ASPUN® 6811A linear low density polyethylene, 2553 LLDPE and 25355 and 12350 high density polyethylene are such suitable polymers. The polyethylenes have melt flow rates in g/10 min. at 190° F. and a load of 2.16 kg, of about 26, 40, 25 and 12, respectively. Fiber forming polypropylenes include Exxon Chemical Company's ESCORENE® PD 3445 polypropylene and Himont Chemical Co.'s PF-305. Many other polyolefins are commercially available.

Turning to FIG. 1, a process line 10 for preparing an embodiment of the present invention is disclosed. The process line 10 is arranged to produce conjugate continuous filaments, but it should be understood that the present invention comprehends nonwoven fabrics made with multicomponent filaments having more than two components. For example, the fabric of the present invention can be made with filaments having three or four components. The process line 10 includes a pair of extruders 12a and 12b for separately extruding a polymer component A and a polymer component B. Polymer component A is fed into the respective extruder 12a from a first hopper 14a and polymer component B is fed into the respective extruder 12b from a second hopper 14b. Polymer components A and B are fed from the extruders 12a and 12b through respective polymer conduits 16a and 16b to a spinneret 18. Spinnerets for extruding conjugate filaments are well-known to those of ordinary skill in the art and thus are not described herein detail. Generally described, the spinneret 18 includes a housing containing a spin pack which includes a plurality of plates stacked one on top of the other with a pattern of openings arranged to create flow paths for directing polymer components A and B separately through the spinneret. The spinneret 18 has openings arranged in one or more rows. The spinneret openings form a downwardly extending curtain of filaments which the polymers are extruded through the spinneret. For the purposes of the present invention, spinneret 18 may be arranged to form side-by-side or eccentric sheath/core conjugate filaments.

The process line 10 also includes a quench blower 20 positioned adjacent the curtain of filaments extending from the spinneret 18. Air from the quench air blower 20 quenches the filaments extending from the spinneret 18. The quench air can be directed from one side of the filament curtain as shown in FIG. 1, or both sides of the filament curtain.

A fiber draw unit or aspirator 22 is positioned below the spinneret 18 and receives the quenched filaments. Fiber draw units or aspirators for use in melt spinning polymers are well-known as discussed above. Suitable fiber draw units for use in the process of the present invention include a linear, fiber aspirator of the type shown in U.S. Pat. No. 3,802,817 and eductive guns of the type shown in U.S. Pat. Nos. 3,692,618 and 3,423,266, the disclosures of which are incorporated herein by reference.

Generally described, the fiber draw unit 22 includes an elongate vertical passage through which the filaments are drawn by aspirating air entering from the sides of the passage and flowing downwardly through the passage. A heater 24 supplies hot aspirating air to the fiber draw unit 22. The hot aspirating air draws the filaments and ambient air through the fiber draw unit and may be used to produce crimp.

An endless foraminous forming surface 26 is positioned below the fiber draw unit 22 and receives the continuous filaments from the outlet opening of the fiber draw unit. The forming surface 26 travels around guide rollers 28. A vacuum 30 positioned below the forming surface 26 where the filaments are deposited draws the filaments against the forming surface.

The process line 10 as shown also includes a hot-air knife 34 which is positioned above the web on the forming surface 26. A hot air knife is a device which focuses a stream of heated air at a very high flow rate, generally from about 1000 to about 10,000 feet per minute (fpm) (305 to 3050 meters per minute), or more particularly from about 3000 to 5000 feet per minute (915 to 1525 m/min.) directed at the nonwoven web immediately after its formation. The air temperature is usually in the range of the melting point of at least one of the polymers used in the web, generally between about 200 and 550° F. (93 and 290° C.) for the thermoplastic polymers commonly used in spunbonding. The control of air temperature, velocity, pressure, volume and other factors helps avoid damage to the web while increasing its integrity. The HAK's focused stream of air is arranged and directed by at least one slot of about ⅛ to 1 inches (3 to 25 mm) in width, particularly about ⅜ inch (9.4 mm), serving as the exit for the heated air towards the web, with the slot running in a substantially cross-machine direction over substantially the entire width of the web. In other embodiments, there may be a plurality of slots arranged next to each other or separated by a slight gap. In addition, the process line includes a bonding apparatus which is a through-air bonder 36. After passing through the through-air bonder, the web is passed between a charging wire or bar 48 and a charged roller 42 and then between a second charging wire or bar 50 and roller 44.

Lastly, the process line 10 includes a winding roll 46 for taking up the finished fabric.

To operate the process line 10, the hoppers 14a and 14b are filled with the respective polymer components A and B. Polymer components A and B are melted and extruded by the respective extruders 12a and 12b through polymer conduits 16a and 16b and the spinneret 18. Although the temperatures of the molten polymers vary depending on the polymers used, when polypropylene and polyethylene are used as components A and B respectively, the preferred temperatures of the polymers range from about 370° to about 530° F. and preferably range from 400° to about 450° F.

As the extruded filaments extend below the spinneret 18, a stream of air from the quench blower 20 at least partially quenches the filaments to develop a latent helical crimp in the filaments at an air temperature of about 45° to about 90° F. and an air velocity from about 100 to about 400 feet per minute.

After quenching, the filaments are drawn into the vertical passage of the fiber draw unit 22 by a flow of hot air from the heater 24 through the fiber draw unit. The fiber draw unit is preferably positioned 30 to 60 inches below the bottom of the spinneret 18. The temperature of the air supplied from the heater 24 is sufficient that, after some cooling due to mixing with cooler ambient air aspirated with the filaments, the air can heat the filaments to a temperature required to crimp the fibers, in the case of crimpable fibers, by activating the latent crimp. The temperature required to activate the latent crimp of heat crimpable filaments ranges from about 110° F. to a maximum temperature less that the melting point of the lower melting component which for through-air bonded materials is the second component B. The temperature of the air from the heater 24 and thus the temperature to which the filaments are heated can be varied to achieve different levels of crimp. Generally, a higher air temperature produces a higher number of crimps. The ability to control the degree of crimp present in crimpable filaments is particularly advantageous because it allows one to change the resulting density and pore size distribution of the fabric by simply adjusting the temperature of the air in the fiber draw unit.

After extrusion, the filaments are deposited through the outlet opening of the fiber draw unit 22 onto the traveling forming surface 26. The vacuum 30 draws the filaments against the forming surface 26 to form an unbonded, nonwoven web of continuous filaments. The web is then given a degree of integrity by the hot-air knife 34 and through-air bonded in the through-air bonder 36.

In the through-air bonder 36, air usually having a temperature above the melting temperature of component B and below the melting temperature of component A is directed from the hood 40, through the web, and into the perforated roller 38. Note that it is possible to use air above the melting temperature of component A with careful control and attention that the web temperature itself never exceeds the melting temperature of component A. Alternatively, the through-air bonder may be a flat arrangement wherein the air is directed vertically downward onto the web. The operating conditions of the two configurations are similar, the primary difference being the geometry of the web during bonding. The hot air melts the lower melting polymer component B and thereby forms bonds between the conjugate filaments to integrate the web. When polypropylene and polyethylene are used as polymer components A and B respectively, the air flowing through the through-air bonder usually has a temperature ranging from about 230° F. to about 325° F. (110° C. to 162° C.). and a velocity from about 100 to about 500 feet per minute. It should be understood, however, that the parameters of the through-air bonder depend on factors such as the type of polymers used and thickness of the web.

The web is then passed through the charged field between the charging bar or wire 48 and the charging drum or roller 42 and then through a second charged field of opposite polarity created between charging bar or wire 50 and charging drum or roller 44. The web may be charged at a range of about −5 kVDC/cm to 25 kVDC/cm.

Lastly, the finished web is wound onto the winding roller 46 and is ready for further treatment or use.

The key attributes for filter fabric for a breathing mask are Frazier Permeability and NaCl efficiency. It is believed that the larger fiber layer of such a fabric should have a Frazier Permeability of greater than 100 CFM/SF and the overall fabric a NaCl efficiency of greater than 80 percent. The fabric suitable for use as a breathing mask desirably has a basis weight between about 100 and 340 gsm.

While it has been found that an electret treated through-air bonded spunbond fabric alone will provide the desired NaCl efficiency and Frazier Permeability, the resulting breathing mask is relatively expensive to produce because of the thickness of material needed. The inventors have found that a layer of finer microfibers used adjacent to and in conjunction with a larger fiber web allows for the use of a much lighter larger fiber web while retaining the desired NaCl efficiency and Frazier Permeability. This novel invention results in a lighter and lower cost breathing mask than one having only spunbond fibers. More particularly, a fabric comprised of between 50 and 95 weight percent of a through-air bonded, electret treated, nonwoven microfiber first web of fibers where the fibers have an average diameter of between about 10 and 25 microns and where the first web has a Frazier Permeability above about 100 CFM/SF, a density of between about 0.015 and 0.15 gms/cc, and a basis weight between about 100 gsm and about 340 gsm, combined with between about 5 and 50 weight percent of an electret treated microfiber second web of fibers where the fibers have an average diameter of less than about 10 microns, results in a fabric which is sufficiently light in weight, permeable, yet which possesses the requisite filtration efficiency.

The finer fiber web used in conjunction with the larger fiber web should also be electret treated. This electret treatment is carried out in the same manner as the electret treatment of a spunbond web. The finer fiber web may be electret treated at a charge having the same range as that given above for the spunbond web. The finer fiber web may be made of any polymer known to those skilled in the art to be suitable for fine fiber production and electret treatment. Polyolefins are particularly desired and more particularly polypropylene.

Figure 2:
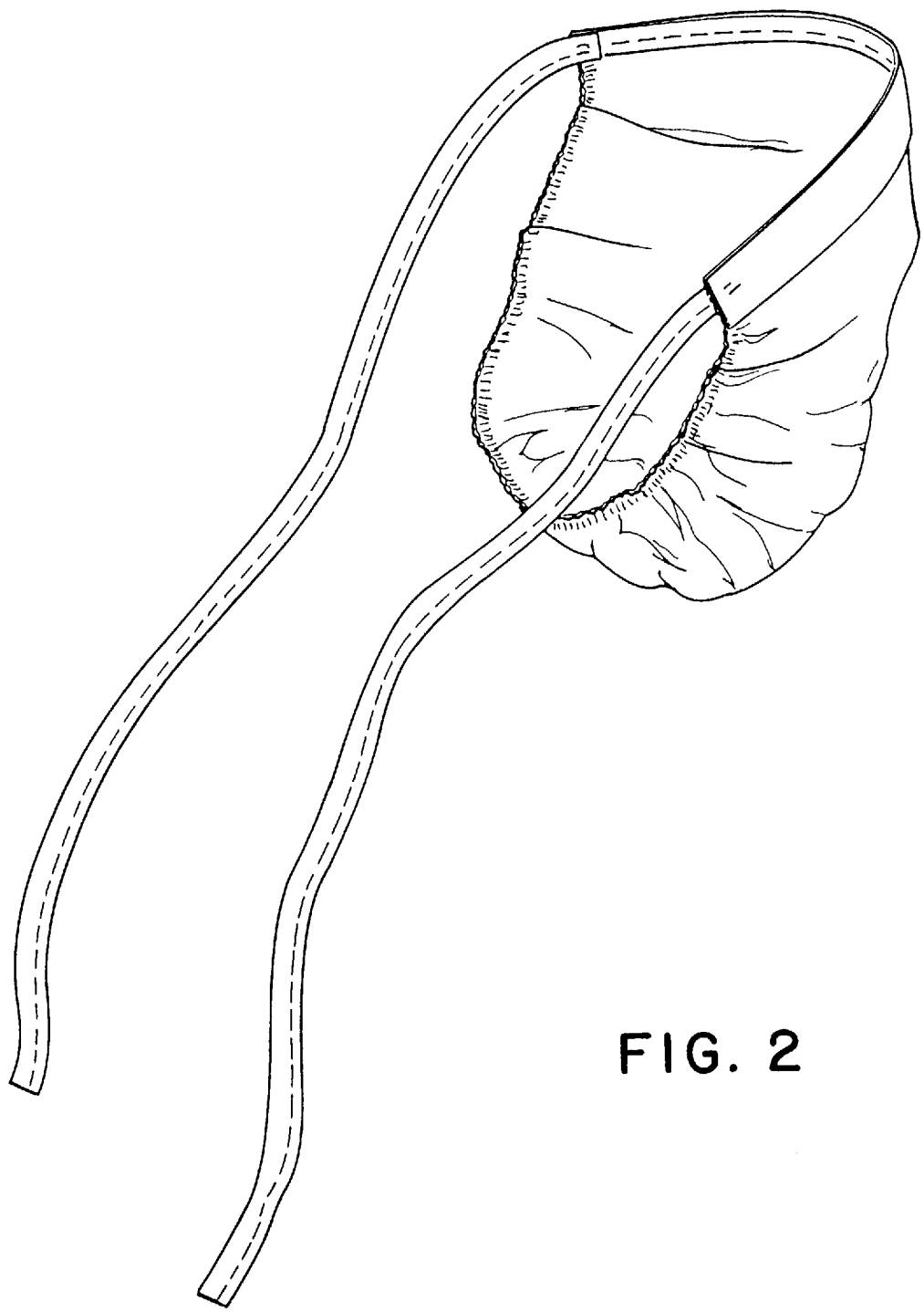
FIG. 2 is a drawing of a typical face mask.
Figure 3:
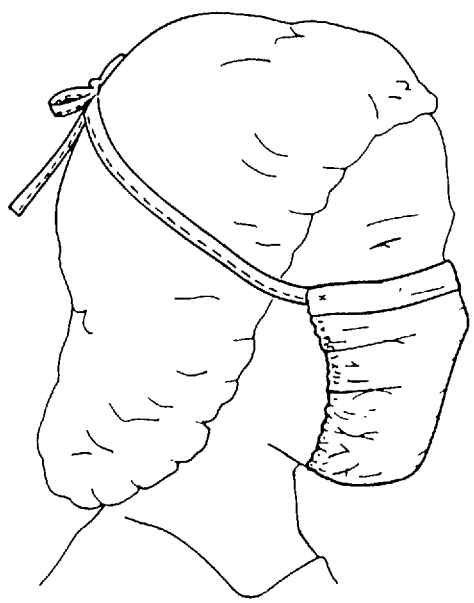
FIG. 3 shows a face mask on a wearer.

The fabric of this invention may be made into a breathing mask by any method known in the art to be effective. A typical face mask, for example, is shown in FIG. 2 and on a wearer in FIG. 3. Further information concerning face masks may be found in U.S. Pat. No. 4,662,005 to Grier-ldris, commonly assigned, which is incorporated by reference. In the construction of a breathing mask using more than one layer, for example, a spunbond and meltblown layer, the spunbond and meltblown layers are not bonded together across the entire fabric area as is conventionally done in many nonwoven applications, but merely ultrasonically bonded about the edges since bonding generally reduces the area available for air flow through the fabric. That is, there is no bond between the layers across the majority of the fabric formed by the layers, but they only are in physical proximity held in place adjacent to each other by peripheral ultrasonic bonding.

It is also possible to laminate a tissue or film to the webs of this invention for various specialty applications. Tissues are used in known breathing masks in order to increase softness of the mask against the skin. Films are used for increased splash protection and must, of course, be breathable for this application.

Various webs were produced in order to test the invention and they are described in Table 1. In the Table, all samples of spunbond fabric are side-by-side conjugate fibers. The polymers used in the conjugate spunbond were Exxon's ESCORENE® PD 3445 polypropylene as component A and Dow's ASPUN® 6811A linear low density polyethylene as component B in a 50/50 ratio. The density of the spunbond webs in samples 1, 7 and 8 was about 0.04 gm/cc and the density of the spunbond webs in samples 2, 9 and 10 was about 0.11 gms/cc. The meltblown webs were made of Exxon's 3746G polypropylene having a melt flow rate of about 800 which was extruded at a rate of 2 pounds per hole per inch (phi) with a forming height of 11 inches (28 cm). All webs were electret treated. The spunbond webs were electret treated at −5 KVDC/cm and 25 KVDC/cm. The meltblown webs were electret treated at 12 KVDC/cm and 5 KVDC/cm. In the webs having more than one layer, the layers were not bonded together but merely placed adjacent each other for the tests.

After formation, the webs were tested for pressure drop and filtration efficiency by the methods shown. The results are shown in Table 1.

TABLE 1

| Sample | Basis Weight spunbond layer (gsm) | Basis Weight meltblown layer (gsm) | Frazier Permeability ($ft^3/min/ft^2$) | % Efficency (0.1 um NaCl) | Differential Pressure (mm $H_2O$) |
|---|---|---|---|---|---|
| 1 | 102 | 0 | 429 | 70 | 0.23 |
| 2 | 102 | 0 | 233 | 81 | 0.53 |
| 3 | 0 | 9 | 303 | 63 | 0.40 |
| 4 | 0 | 17 | 111 | 84 | 1.00 |
| 5 | 0 | 20 | 90 | 85 | 1.60 |
| 6 | 0 | 34 | 52 | 94 | 3.00 |
| 7 | 102 | 9 | 190 | 91 | 0.70 |
| 8 | 102 | 17 | 111 | 96 | 1.27 |
| 9 | 102 | 9 | 136 | 94 | 1.00 |
| 10 | 102 | 17 | 84 | 97 | 1.60 |

The Table shows that the large fiber, spunbond layer, alone has a high Frazier permeability but low efficiency and the fine fiber, meltblown layer, has a low Frazier permeability but high efficiency. Putting the layers together surprisingly produces a fabric with the high efficiency characteristic of meltblown while also maintaining an acceptably high Frazier permeability. This result is also reflected in the pressure differential data which shows that the multilayer laminates have acceptable pressure drops.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A breathing mask filter fabric laminate comprising:
   between about 50 and 95 weight percent of a through-air bonded, electret treated, nonwoven microfiber first web of generally continuous fibers wherein said fibers have an average diameter of between about 10 and 25 microns and wherein said first web has a Frazier permeability above about 100 CFM/SF, a density of between about 0.015 and 0.15 gms/cc, and a basis weight up to about 340 gsm, and
   between about 5 and 50 weight percent of an electret treated microfiber second web of fibers wherein said fibers have an average diameter of less than about 10 microns.

2. The breathing mask fabric of claim 1 which is pleated.

3. The breathing mask fabric of claim 1 wherein said first web microfibers are comprised of polymers in a conjugate spunbond configuration.

4. The breathing mask fabric of claim 3 wherein said conjugate spunbond configuration is side-by-side.

5. The breathing mask fabric of claim 3 wherein said conjugate spunbond configuration is sheath/core.

6. The breathing mask fabric of claim 3 wherein said polymers are polypropylene and polyethylene.

7. The breathing mask fabric of claim 5 wherein said polymers are polyethylene and polyamide.

8. The breathing mask fabric of claim 1 wherein said second web microfibers are comprised of polypropylene.

9. The breathing mask fabric of claim 1 wherein said first and second webs have been peripherally bonded.

10. The breathing mask fabric of claim 9 wherein said peripheral bonding is performed ultrasonically.

11. The breathing mask fabric of claim 1 wherein said fabric has a NaCl efficiency of at least 80 percent.

12. The breathing mask fabric of claim 1 wherein said fabric has a NaCl efficiency of at least 95 percent.

13. The breathing mask fabric of claim 1 wherein said fabric has a NaCl efficiency of at least 99 percent.

14. The breathing mask fabric of claim 1 wherein said fabric has a NaCl efficiency of at least 99.7 percent.

15. The breathing mask fabric of claim 1 wherein said first web has a density of between about 0.015 and 0.08 gms/cc.

16. The breathing mask fabric of claim 1 wherein said first web has a density of between about 0.015 and 0.04 gms/cc.

17. A face mask comprised of the fabric of claim 1.

18. A respirator comprised of the fabric of claim 1.

19. A breathing mask filter fabric laminate comprising:

between about 80 and 90 weight percent of through-air bonded, electret treated spunbound web of conjugate fibers wherein said web has a Frazier permeability above 100 CFM/SF, a density between about 0.015 and 0.08 gms/cc and a basis weight up to about 200 gsm, and between about 10 and 20 weight percent of an electret treated meltblown polypropylene web.

20. The breathing mask fabric of claim 19 wherein said conjugate fibers are arranged in a side-by-side configuration.

21. The breathing mask fabric of claim 20 wherein said conjugate fibers are comprised of polypropylene and polyethylene.

22. The breathing mask fabric of claim 19 wherein said first and second webs have been peripherally bonded.

23. The breathing mask fabric of claim 22 wherein said peripheral bonding is performed ultrasonically.

24. The breathing mask fabric of claim 19 further comprising a film.

25. The breathing mask fabric of claim 19 further comprising a tissue.

26. A face mask comprised of the fabric of claim 19.

27. A respirator comprised of the fabric of claim 19.

\* \* \* \* \*